United States Patent
Volkov (10) Patent No.: US 10,430,588 B2
(45) Date of Patent: Oct. 1, 2019

(54) METHOD OF AND SYSTEM FOR ANALYSIS OF INTERACTION PATTERNS OF MALWARE WITH CONTROL CENTERS FOR DETECTION OF CYBER ATTACK

(71) Applicant: TRUST LTD., Moscow (RU)

(72) Inventor: Dmitry Aleksandrovich Volkov, Moscow (RU)

(73) Assignee: TRUST LTD., Moscow (RU)

( * ) Notice: Subject to any disclaimer, the term of this patent is extended or adjusted under 35 U.S.C. 154(b) by 70 days.

(21) Appl. No.: 15/642,529

(22) Filed: Jul. 6, 2017

(65) Prior Publication Data
US 2018/0012021 A1    Jan. 11, 2018

(30) Foreign Application Priority Data
Jul. 6, 2016 (RU) ................................ 2016127245

(51) Int. Cl.
*H04L 29/06* (2006.01)
*G06F 21/56* (2013.01)
(Continued)

(52) U.S. Cl.
CPC ............ *G06F 21/566* (2013.01); *G06F 21/53* (2013.01); *G06F 21/554* (2013.01);
(Continued)

(58) Field of Classification Search
CPC ...... G06F 21/566; G06F 21/53; G06F 21/554; H04L 63/1408; H04L 63/1416; H04L 63/1433; H04L 63/1491
(Continued)

(56) References Cited

U.S. PATENT DOCUMENTS

| 7,730,040 B2 | 6/2010 | Reasor et al. |
| 7,865,953 B1 | 1/2011 | Hsieh et al. |

(Continued)

FOREIGN PATENT DOCUMENTS

| EP | 1160646 A2 | 12/2001 |
| EP | 2410452 B1 | 1/2016 |

(Continued)

OTHER PUBLICATIONS

English Abstract of RU107616 retrieved on Espacenet on Jul. 3, 2017.
(Continued)

*Primary Examiner* — Haresh N Patel
(74) *Attorney, Agent, or Firm* — BCF LLP (57) ABSTRACT

This technical solution relates to systems and methods of cyber attack detection, and more specifically it relates to analysis methods and systems for protocols of interaction of malware and cyber attack detection and control centers (servers). The method comprises: uploading the malware application into at least one virtual environment; collecting, by the server, a plurality of malware requests transmitted by the malware application to the malware control center; analyzing the plurality of malware requests to determine, for each given malware request: at least one malware request parameter contained therein; and an order thereof of the at least one malware request parameter. The method then groups the plurality of malware requests based on shared similar malware request parameters contained therein and order thereof and for each group of the at least one group containing at least two malware requests, generates a regular expression describing malware request parameters and order thereof of the group, which regular expression can be used as an emulator of the malware application.

20 Claims, 3 Drawing Sheets

(51) Int. Cl.
  *G06F 21/53* (2013.01)
  *G06F 21/55* (2013.01)
  *H04L 29/08* (2006.01)

(52) U.S. Cl.
  CPC ...... *H04L 63/1408* (2013.01); *H04L 63/1416* (2013.01); *H04L 63/1433* (2013.01); *H04L 63/1491* (2013.01); *G06F 2221/2127* (2013.01); *H04L 63/14* (2013.01); *H04L 63/1425* (2013.01)

(58) Field of Classification Search
  USPC .......................................................... 726/23
  See application file for complete search history.

(56) References Cited

U.S. PATENT DOCUMENTS

| | | | |
|---|---|---|---|
| 7,958,555 | B1 | 6/2011 | Chen et al. |
| 7,984,500 | B1 | 7/2011 | Khanna et al. |
| 8,151,341 | B1 | 4/2012 | Gudov |
| 8,402,543 | B1 | 3/2013 | Ranjan et al. |
| 8,448,245 | B2 | 5/2013 | Banerjee et al. |
| 8,532,382 | B1 | 9/2013 | Ioffe |
| 8,539,582 | B1 | 9/2013 | Aziz et al. |
| 8,555,388 | B1 | 10/2013 | Wang et al. |
| 8,561,177 | B1 | 10/2013 | Aziz et al. |
| 8,612,463 | B2 | 12/2013 | Brdiczka et al. |
| 8,625,033 | B1 | 1/2014 | Marwood et al. |
| 8,635,696 | B1 | 1/2014 | Aziz |
| 8,650,080 | B2 | 2/2014 | O'Connell et al. |
| 8,660,296 | B1 | 2/2014 | Ioffe |
| 8,677,472 | B1 | 3/2014 | Dotan et al. |
| 8,776,229 | B1 | 7/2014 | Aziz |
| 8,850,571 | B2 | 9/2014 | Staniford et al. |
| 8,856,937 | B1 | 10/2014 | Wüest et al. |
| 9,060,018 | B1 | 6/2015 | Yu et al. |
| 9,215,239 | B1 | 12/2015 | Wang et al. |
| 9,253,208 | B1 | 2/2016 | Koshelev |
| 9,330,258 | B1 | 5/2016 | Satish et al. |
| 9,736,178 | B1 | 8/2017 | Ashley |
| 9,917,852 | B1 | 3/2018 | Xu et al. |
| 9,934,376 | B1 | 4/2018 | Ismael |
| 2003/0009696 | A1 | 1/2003 | Bunker et al. |
| 2006/0107321 | A1 | 5/2006 | Tzadikario et al. |
| 2006/0224898 | A1 | 10/2006 | Ahmed |
| 2009/0138342 | A1 | 5/2009 | Otto et al. |
| 2010/0037314 | A1 | 2/2010 | Perdisci et al. |
| 2010/0076857 | A1 | 3/2010 | Deo et al. |
| 2010/0191737 | A1 | 7/2010 | Friedman et al. |
| 2012/0079596 | A1* | 3/2012 | Thomas ............... G06F 21/55 726/24 |
| 2012/0158626 | A1 | 6/2012 | Zhu et al. |
| 2012/0233656 | A1 | 9/2012 | Rieschick et al. |
| 2012/0291125 | A1* | 11/2012 | Maria ............... H04L 63/1416 726/22 |
| 2013/0086677 | A1 | 4/2013 | Ma et al. |
| 2013/0191364 | A1 | 7/2013 | Kamel et al. |
| 2013/0263264 | A1 | 10/2013 | Klein et al. |
| 2013/0340080 | A1 | 12/2013 | Gostev et al. |
| 2014/0058854 | A1 | 2/2014 | Ranganath et al. |
| 2014/0082730 | A1 | 3/2014 | Vashist et al. |
| 2014/0173287 | A1* | 6/2014 | Mizunuma ............ H04L 9/0891 713/176 |
| 2014/0310811 | A1 | 10/2014 | Hentunen |
| 2015/0007250 | A1 | 1/2015 | Dicato, Jr. et al. |
| 2015/0049547 | A1* | 2/2015 | Kim ............... G11C 29/028 365/185.09 |
| 2015/0067839 | A1 | 3/2015 | Wardman et al. |
| 2015/0163242 | A1* | 6/2015 | Laidlaw ............ G06F 21/552 726/22 |
| 2015/0200963 | A1 | 7/2015 | Geng et al. |
| 2015/0363791 | A1 | 12/2015 | Raz et al. |
| 2015/0381654 | A1 | 12/2015 | Wang et al. |
| 2016/0036837 | A1* | 2/2016 | Jain ............... H04L 63/1416 726/23 |
| 2016/0036838 | A1* | 2/2016 | Jain ............... H04L 63/1416 726/23 |
| 2016/0044054 | A1* | 2/2016 | Stiansen ............ H04L 63/1416 726/24 |
| 2016/0065595 | A1 | 3/2016 | Kim et al. |
| 2016/0112445 | A1* | 4/2016 | Abramowitz ......... G06Q 40/08 726/23 |
| 2016/0149943 | A1 | 5/2016 | Kaloroumakis et al. |
| 2016/0191243 | A1 | 6/2016 | Manning |
| 2016/0205123 | A1* | 7/2016 | Almurayh ........... H04L 63/1425 726/23 |
| 2016/0261628 | A1* | 9/2016 | Doron ................ H04L 63/1458 726/23 |
| 2016/0267179 | A1 | 9/2016 | Mei et al. |
| 2016/0285907 | A1* | 9/2016 | Nguyen .............. H04L 63/1433 726/23 |
| 2017/0142144 | A1* | 5/2017 | Weinberger ......... H04L 63/0263 726/23 |
| 2017/0200457 | A1* | 7/2017 | Chai ..................... G10L 25/51 726/23 |
| 2017/0230401 | A1* | 8/2017 | Ahmed ............. H04L 63/1433 726/23 |
| 2017/0279818 | A1 | 9/2017 | Milazzo et al. |
| 2017/0289187 | A1* | 10/2017 | Noel ................... H04L 63/1433 726/23 |
| 2017/0295157 | A1 | 10/2017 | Chavez et al. |
| 2017/0295187 | A1 | 10/2017 | Havelka et al. |
| 2017/0324738 | A1 | 11/2017 | Hari et al. |
| 2018/0012021 | A1* | 1/2018 | Volkov ................. G06F 21/53 726/23 |
| 2018/0096153 | A1* | 4/2018 | DeWitte ............. G06F 21/552 726/23 |

FOREIGN PATENT DOCUMENTS

| | | |
|---|---|---|
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| WO | 0245380 A2 | 6/2000 |
| WO | 2009/026564 A1 | 2/2009 |
| WO | 2011/045424 A1 | 4/2011 |
| WO | 2012/015171 A2 | 2/2012 |

OTHER PUBLICATIONS

European Search Report with regard to EP 17 19 1900 completed on Nov. 28, 2017.
European Search Report with regard to EP 17 19 1900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.

(56) References Cited

OTHER PUBLICATIONS

Search Report with regard to the counterpart RU Patent Application No. 2016137336 completed Jun. 6, 2017, p. 1.
English Abstract of RU2522019 retrieved on Espacenet on Jan. 25, 2019, p. 1.
Search Report with regard to the counterpart RU Patent Application No. 2017140501 completed Jul. 11, 2018, p. 1.
European Search Report with regard to the counterpart EP Patent Application No. EP17211131 completed Apr. 12, 2018, p. 1.
European Search Report with regard to the counterpart EP Patent Application No. EP17210904 completed May 16, 2018, p. 1.
Search Report with regard to the counterpart RU Patent Application No. 2018101764 completed Jun. 29, 2018, p. 1.
Search Report with regard to the counterpart RU Patent Application No. 2018101761 completed Jun. 20, 2018, p. 1.
International Search Report with regard to the counterpart Patent Application No. PCT/RU2016/000526 dated Jun. 1, 2017, p. 1.
Search Report with regard to the counterpart RU Patent Application No. 2018101760 completed Jun. 22, 2018, p. 1.
Search Report with regard to the counterpart RU Patent Application No. 2018101759 completed Sep. 7, 2018, p. 1.
English Abstract of RU129279 retrieved on Espacenet on Sep. 11, 2017, p. 1.
English Abstract of RU164629 retrieved on Espacenet on Sep. 11, 2017, p. 1.
English Abstract of RU2538292 retrieved on Espacenet on Sep. 11, 2017, p. 1.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018, p. 1.
Search Report with regard to the counterpart RU Patent Application No. 2018101763 completed Jan. 11, 2019, p. 1.
European Search Report with regard to EP17180099 completed on Nov. 28, 2017, p. 1.
Office Action with regard to the counterpart U.S. Appl. No. 15/707,641 dated Apr. 25, 2019, p. 1.

\* cited by examiner

METHOD OF AND SYSTEM FOR ANALYSIS OF INTERACTION PATTERNS OF MALWARE WITH CONTROL CENTERS FOR DETECTION OF CYBER ATTACK

CROSS-REFERENCE

The present application claims convention priority to Russian Utility Patent Application No. 2016127245, filed on Jul. 6, 2016, the entirety of which is incorporated herein by reference.

TECHNICAL FIELD

This technical solution relates to systems and methods of cyber attack detection, and, more specifically, to methods of and systems for analysis of interaction patterns of malware with control centers for detection of cyber attack.

BACKGROUND

Owing to development of computer engineering and networks, the issue related to detection of cyber attacks becomes increasingly important.

At the present moment there are various technologies related to detection of cyber attacks in which file, network traffic, and behaviour analysis is used. Such technologies enable rather effective detection of attacks within the protected network segment. However, there emerges a need for detection and tracing of attacks even in those segments in which there are no means of detection of such attacks.

In order to detect network attacks in unprotected resources it is possible to plant malware which is able to receive instructions from remote control servers in which targets to be attacked and attack parameters are specified. However, such approach has some disadvantages and restrictions:

When planting malware, one need to wait until it calls a remote server for instructions or launches an attack. Depending on specific settings of the malware, the interval of interaction with the remote server may take from several minutes to several hours.

To continuously analyze commands received from a specific control server, the computer with malware is typically turned on continuously.

Instructions received from a control server may be encrypted or encoded.

In order to analyze instructions from many control servers sent to various types of malware, an isolated environment is typically maintained for each piece of malware, otherwise such pieces of malware may conflict with each other.

U.S. Pat. No. 9,443,075-B2 (applicant: MITRE Corp; published on Sep. 13, 2016) discloses a method of interception of and application to malware that can be adapted to activity of a specific piece of malware in a compromised computer system. This technical solution analyzes traffic between the infected computed and the server, thus, narrowing the covered area as it becomes impossible to examine malicious links that have never been encountered in the protected system. Manual reverse-engineering of the protocol of interaction of malware and the server, which interferes with automation of the analysis process is another specific feature of this solution.

SUMMARY

Present technical solution is aimed at elimination of defects intrinsic to solutions available in the prior art.

Present technical solution is aimed at solving a technical problem of development of an analysis method and system for protocols of interaction of malware and cyber attack detection and control servers by way of emulation of network malware activity.

In accordance with a first broad aspect of the present technology, there is provided a method for analyzing an interaction framework between a malware application and a malware control center associated with the malware application, the method executable by a server; the malware application, the malware control center and the server of the method being communicatively coupled via a communication network. The method comprises: uploading the malware application into at least one virtual environment, the at least one virtual environment being executable by the server; collecting, by the server, a plurality of malware requests transmitted by the malware application to the malware control center via the communication network; analyzing the plurality of malware requests to determine, for each given malware request: at least one malware request parameter contained therein; and an order thereof of the at least one malware request parameter; grouping, into at least one group, the plurality of malware requests based on shared similar malwre request parameters contained therein and order thereof; for each group of the at least one group containing at least two malware requests, generating a regular expression describing malware request parameters order thereof of the group; transmitting, via the communication network, a server-generated request, the server-generated request having been generated based on the regular expression, to the malware control center; receiving from the malware control center a control center response to the server-generated request; analyzing the control center response for presence of data representative of characteristic of a cyber attack; in response to the analyzing rendering a positive outcome indicative of the presence of data representative of characteristics of the cyber attack: storing, in a memory, a cyber attack pattern generated based on the data representative of characteristics of the cyber attack; using the cyber attack pattern to determine an occurrence of a future cyber attack launched by the malware control center.

In some implementation of the method, in response to the control center response being encoded or encrypted, the method further comprises decoding or decrypting the control center response, respectively.

In some implementation of the method, the analyzing the control center response for presence of data representative of characteristic of a cyber attack comprises: determining whether the control center responses comprise an indication of an attack target and an indication of an attack action.

In some implementation of the method, the determining whether the control center responses comprise an indication of an attack target and an indication of an attack action comprises applying one of a regular expressions and signatures bases analysis.

In some implementation of the method, the transmitting, via the communication network, the server-generated request is executed without further executing the malware application by the at least one virtual environment.

In some implementation of the method, the method further comprises, prior to the uploading the malware application into the at least one virtual environment, obtaining the malware application.

In some implementation of the method, parameters of the at least one virtual environment are received from external sources and then applied to the at least one virtual environment.

In some implementation of the method, collecting, by the server, the plurality of malware requests transmitted by the malware application to the malware control center is executed using a HTTP, FTP, DNS, or IRC data transfer application level protocol.

In some implementation of the method, the memory comprises at least one of: nonvolatile memory, a volatile memory, and a data storage device.

In some implementation of the method, wherein the data storage device is at least one of a file, flat file, key-value store, or a database.

In some implementation of the method, when determining at least one malware request parameter and their order in the at least one of the plurality of malware requests, parameters in text protocols are parsed by parsing a string based on delimiters.

In some implementation of the method, the method further comprises storing the regular expression describing malware request parameters in nonvolatile or volatile memory, or a data storage device. The method of claim 1 wherein each of the plurality of the malware requests is generated with a protocol used for exchange of data with the malware application by the malware control center.

In some implementation of the method, the method further comprises using at least one anonymizer.

In some implementation of the method, the anonymizer is at least one of dynamic proxy servers, TOR (The Union Router), and VPN (Virtual Private Network).

In some implementation of the method, the decoding of the control center response is performed using BASE64 decoding or conversion from Hex format to string format.

In some implementation of the method, the decrypting the control center response is performed using at least one of ROP13 To Text Converter or HTML Encoder.

In some implementation of the method, the memory for storing of the cyber attack pattern is at least one of a nonvolatile, a volatile memory, and a data storage device.

In accordance with another broad aspect of the present technology, there is provided a system for analyzing an interaction framework between a malware application and the malware application's control center. The system comprises: a communication network; a malware control center configured to: receive a plurality of malware requests transmitted by the malware application via the communication network; receive a server-generated request; generate a control center response to the server-generated request; and a server, communicatively coupled to the malware control center via the communication network, the server configured to: execute at least one virtual environment, upload the malware application into the at least one virtual environment; collect a plurality of malware requests transmitted by the malware application to the malware control center via the communication network; analyze the plurality of malware requests to determine, for each given malware request at least one malware request parameter contained therein; and an order thereof of the at least one malware request parameter; group, into at least one group, the plurality of malware requests based on shared similar malware request parameters contained thereof and order thereof; for each group of the at least one group containing at least two malware requests, generate a regular expression describing malware request parameters order thereof of the group; generate a server-generated request based on the regular expression; transmit the a server-generated request to the malware control center via the communication network; receive, from the malware control center, a control center response to the server-generated request; analyze the control center response for presence of data representative of characteristic of a cyber attack; in response to the analyzing, render a positive outcome indicative of the presence of data representative of characteristics of the cyber attack: store, in a memory, a cyber attack pattern generated based on the data representative of characteristics of the cyber attack.

In accordance with another broad aspect of the present technology, there is provided a server for analyzing an interaction framework between a malware application and the malware application's control center. The server comprises: a control center aggregator configured to: collect malware control center data on a plurality of malware control centers from open sources and network traffic analyzers, the malware control center data having addresses of the plurality of malware control centers; transfer the said data to a malware protocol emulator; a network traffic template engine configured to: receive and collect fragments of network traffic, the fragments of network traffic including a plurality of malware requests and a plurality of malware responses generated by the malware application, the malware application being uploaded to a virtual environment executable by the server; determine a plurality of malware request parameters and their order in at least one of the plurality of malware requests; group malware requests with identical sets of malware request parameters; generate a regular expression describing malware request parameters for each group which includes two or more requests; transfer the templates that have been generated to the malware protocol emulator; the malware protocol generator configured to: receive request templates from the network traffic template engine; receive malware control center data from the control centre aggregator; generate emulator-generated requests described by regular expressions received from the network traffic template engine; transmit the emulator-generated requests to malware control centres that have been received from the control centre aggregator; receive a plurality of control center responses from the malware control centres and, if such control center responses were encoded and/or encrypted, decode and/or decrypt the control center responses; analyze control center responses received from control centres for presence of data representative of characteristics of a cyber attack; store a cyber attack pattern generated based on the data representative of characteristics of the cyber attack on a data storage device; the data storage device configured to store data received from the malware protocol emulator.

BRIEF DESCRIPTION OF THE DRAWINGS

Characteristics and advantages of this technical solution will become obvious from the detailed description given below and the drawings appended hereto as follows.

In the Figures, lines between elements depicted in the Figures illustrate interactions between the various illustrated elements.

DETAILED DESCRIPTION

This technical solution can be implemented on a server or as a machine-processable medium containing instructions for running the said method, or containing the said system.

The technical solution described herein may be implemented as a distributed computer system containing two or more servers connected via communication networks. As used herein, a term server refers to a computer system, data processing machine, computer numerical control, programmable logic controller, computerized control system, and any other device capable of performing a pre-set precisely determined sequence of operations (or actions, or instructions) which can obtain data, send requests, and receive responses on other servers and devices via communication networks.

As used herein, a term "command processing device" refers to an electronic block or an integrated circuit (microchip) carrying out (executing) computer instructions (programs).

The command processing device reads and carries out computer instructions (programs) received from one or more data storage devices. Data storage devices include, but are not limited to, hard disk drives (HDD), flash memory, read-only memory (ROM), solid-state disks (SSD), or optical drives.

A term "program", as used herein, refers to is a sequence of instructions to be carried out by a computer control device or a command processing device.

A term "malware application" (also referred to herein as "malware"), as used herein, refers to any software intended for obtaining unauthorized access to computational resources of a computer or to information stored on a computer for the purpose of unauthorized use of computer resources or damaging (causing losses to) the owner of the information, and/or the owner of the computer, and/or the owner of the computer network by way of copying, distorting, deleting, or masquerading the information.

A term "RFC" (Request for Comments), as used herein, refers to a document of a series of numbered Internet information documents involving technical specifications and Standards which are widely used within the Internet.

A term "DoS-Attack", as used herein, refers toa hacker attack on a computing system in order to reduce the latter to failure, i.e. to create conditions in which legal users will not be able to get access to system resources (servers) provided, or to impede access.

A term "regular expressions", as used herein, refers to a formal language of search and manipulations with substrings in a text, which is based on use of metacharacters. In its essence, it is a sample string consisting of characters and metacharacters and defining a search rule.

A term "remote network attack", as used herein, refers to informational destructive impact on a distributed computing system which is implemented in software through communication networks.

A term "sandbox", as used herein, refers to a specifically assigned area for safe running (execution) of computer programs. Such area may be a tightly controlled set of resources for running (executing) a guest program, such as a place on a disk or in memory. In a sandbox network access, a possibility to communicate with the main operational system or to read information from input devices may be partially emulated or significantly limited. A sandbox is an example of virtualization.

A control centre in the field of computer security may include servers and other technical infrastructures used for control of malware application in general, and control of botnets in particular.

A term "botnet" as used herein refers to a network of computers consisting of a number of hosts with launched bots, i.e. programs which may be installed on a victim's computer without knowledge of the latter and which provide an opportunity to the attacker to take some actions using resources of the infected computer.

A term "virtual machine", as used herein, refers to a software (also referred to herein as "program" or "software application") and/or hardware system emulating hardware of a platform (target or guest platform) and running programs for a target-platform on the host-platform, or virtualizing a platform and creating environments on this platform which isolate programs and even operating systems from each other.

A term "virtualization" as used herein, refers to providing a set of computing resources or their logical integration, which is abstracted from hardware representation and at the same time ensures logical isolation of computing processes carried out on the same physical resource from each other.

The example of representation given below is for reference only and does not limit the substance of this solution in any way.

Figure 1:
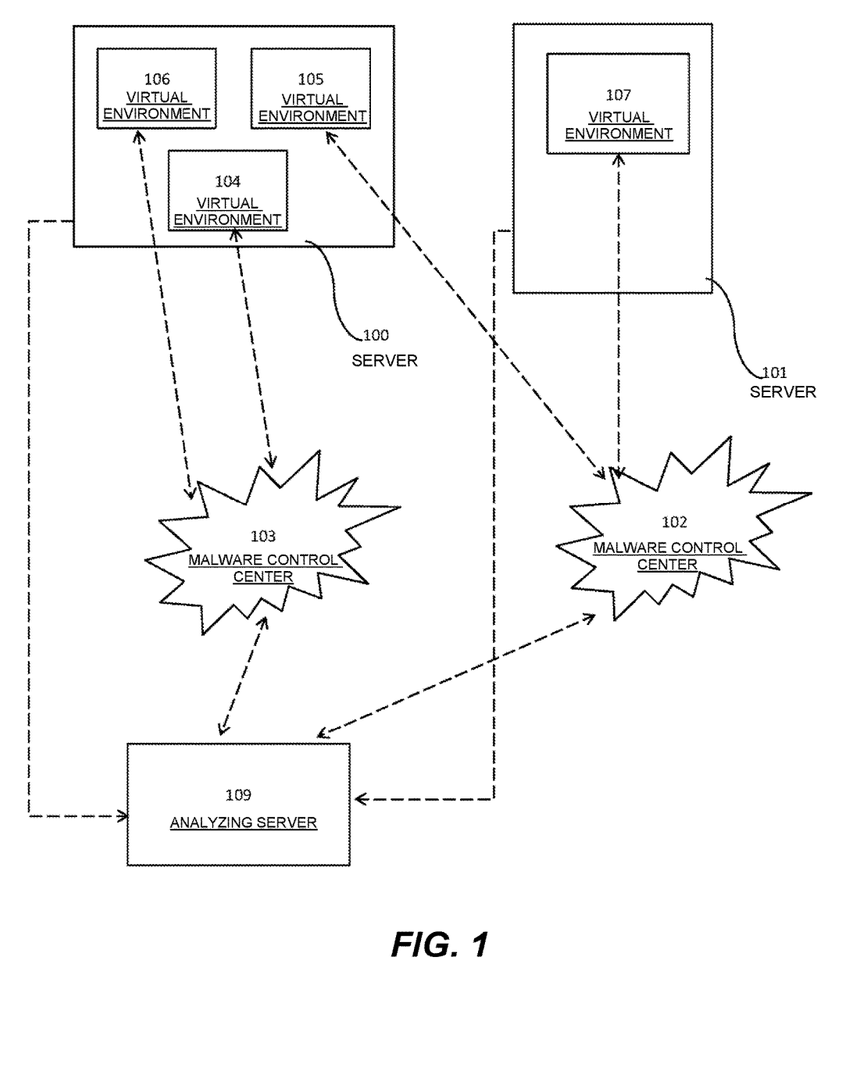
FIG. 1 depicts a schematic diagram of a virtual environment that is used for uploading a malware application in accordance with non-limiting embodiments of the present technology.
Figure 2:
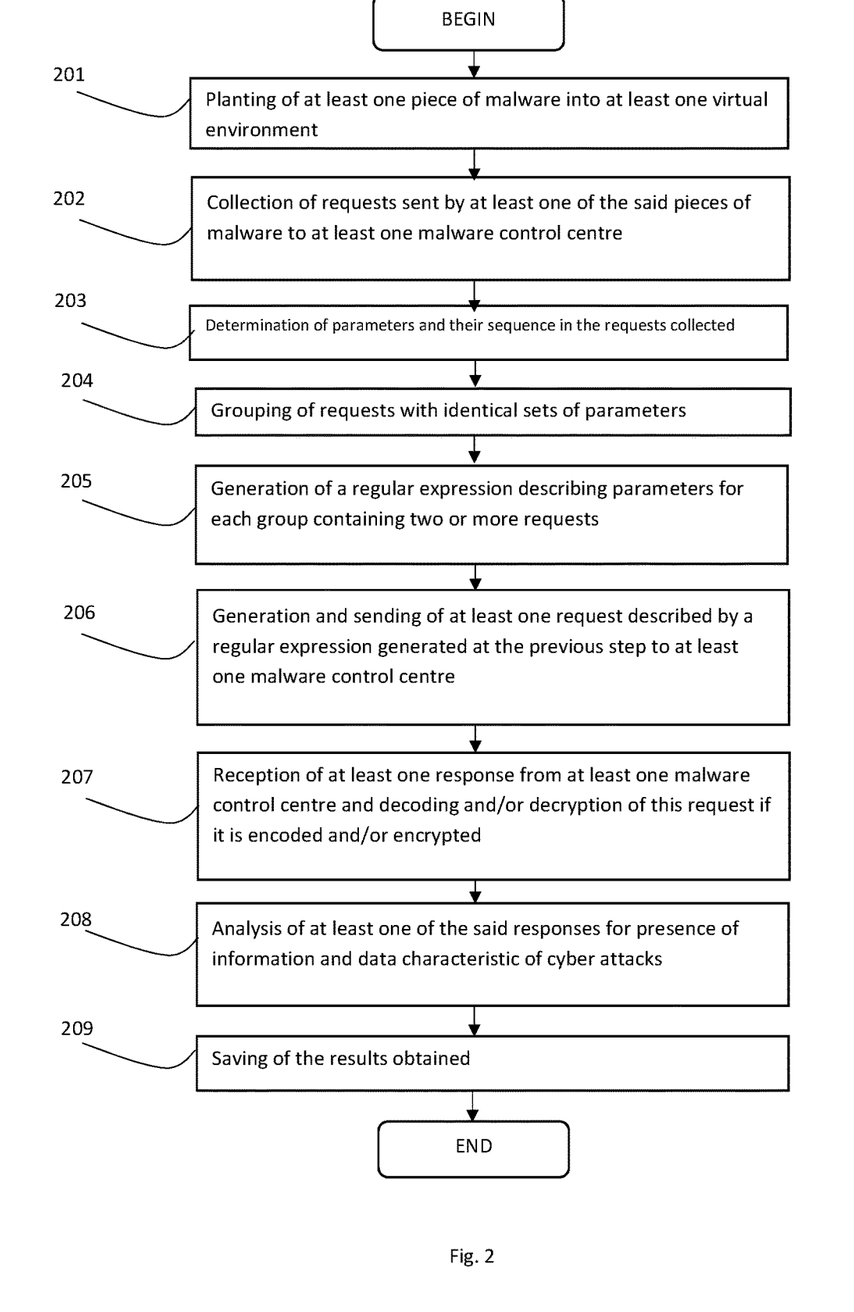
FIG. 2 depicts a block diagram of a flow chart of a method executed in accordance with non-limiting embodiments of the present technology.

Referring to FIG. 1, shown therein is a schematic diagram of a virtual environment that is used for uploading a malware application, in accordance with non-limiting embodiments of the present technology. FIG. 2 shows a block diagram of a flow chart of a method executed in accordance with non-limiting embodiments of the present technology.

At step 201, a malware application is uploaded into at least one virtual environment.

When malware application is executed ("runs") on a server (100 or 101) in a virtual environment (sandbox), it may communicate its status and may receive instructions from a remote server with a malware control center (103 or 102) for this specific malware application installed on it.

In at least one embodiment, a virtual environment may be created using technologies of hardware or software virtualization known from prior art. Intel VT (VT-x, Intel Virtualization Technology for x86) or, for instance, AMD-V may be used as hardware virtualization technologies, while dynamic translation, paravirtualization, or built-in virtualization may be used as software virtualization technologies.

In accordance with some non-limiting embodiments of the present technology, the virtualization is executed at the operating system level, thus, enabling starting isolated and safe virtual machines on one physical node.

For example, VirtualBox, or KVM, or VMware Workstation, or XenServer may be used as a virtual machine (virtual environment).

One embodiment of the solution suggests running multiple pieces of malware application on a server in separate virtual environments. This approach may accelerate the process of collection of information required for running the method.

Referring to FIG. 1, several virtual environments (104, 105, and 106) may be activated on one server (100) with planting at least one piece of malware into each of the environments, which addresses at least one control centre (only two centres, 102 and 103, are given in the figure for demonstration). In at least one embodiment, each virtual environment may be activated on its own server (101).

A computer, tablet, computing cluster, or any other computing device enabling creation and running of a virtual environment (starting a virtual machine) and capable of exchanging data, sending request, and receiving responses from other servers or devices may be used as a server or instead of the server.

Some types of malware applications being planted into a virtual environment are capable of detecting that they are planted in a virtual environment and may change their behavior. In order to detect running in a virtual environment, such malware application may verify settings of drivers, names of devices, services, the operating system register, and other parameters. To solve this issue, the virtual environment may have settings defined such that they may prevent detection of virtualization by the malware application and these settings may depend on virtualization software used.

Some types of malware applications may change their behavior depending on parameters of the environment into which they have been planted. Thus, if a malware application is pre-defined to attack English-speaking users but it determines that the Russian keyboard layout has been chosen by a user, the malware application may stop running. Or, alternatively, if the external IP-address of a computer does not match the target region, the malware application may stop running without communication with the malware control server. If abnormal behavior of the malware application is detected (if, for example, it does not communicate with the malware control server or if it stops running after being launched), the malware-sensitive parameters of the virtual environment may be reset in order to ensure a normal activity (execution) of the malware application.

One embodiment of the solution suggests receiving settings of the virtual environment from external sources and then applying them to the virtual environment.

In at least one embodiment, anonymizers (anonymizing hardware and software) may be used in the virtual environment.

In at least one embodiment, dynamic proxy servers or TOR (The Union Router), or VPN (Virtual Private Network) may be used as anonymizers, the list of which, however, is not limited to the said hardware and software. In alternative embodiments of the present technology other types of anonymizing hardware and software may be used.

At step 202, a plurality of malware requests, transmitted by the malware application to the malware control center via the communication network, is collected by the server.

Malware running on a server (100) in the virtual environment may send malware requests through a communication network to the malware control centre and may receive responses to these requests. Time period in which the program may be allowed to run in the virtual environment, may be pre-set statically or determined dynamically on the basis of the number of malware requests sent to and control center responses received from the control centre.

Communication networks may be, for example, a wire (Ethernet) and a wireless (Wi-Fi) communication networks.

Malware application may send malware requests via communication networks using mainstream data transfer application layer protocols, including but not limited to HTTP, FTP, DNS, and IRC, or its own interaction protocol.

In order to detect requests sent and responses received by the malware application, various traffic analyzers (sniffers) and network activity monitors tracing network activity of the server may be used.

All requests sent by the malware application and responses of the control centre to these requests may be stored in nonvolatile or volatile memory of the server (100). Information about the malware request stored in memory may include, but is not limited to, at least a request method, protocol, and request body. One embodiment of the solution suggests storing additional information including a compression method and information about the client making the request (e.g., user-agent in http).

In at least one embodiment, requests sent by the malware application and responses of the malware control centre to these requests may be stored in a data storage device located on the server (100). Files, flat files, key-value stores, or various databases may serve as data storage devices, without being so limited.

At step 203, the plurality of malware requests are analyzed to determine, for each given malware request: at least one malware request parameter contained therein and an order of the at least one malware request parameter.

An analyzing server (109) may further receive malware requests, control center responses received at the previous step by the virtual environment server (100) and information about them via a communication network. In at least one embodiment, the analyzing server (109) and the virtual environment server (100) may be the same server. Even though the analyzing server 109 and the virtual environment server 100 have been depicted as two separate servers, in alternative embodiments of the present technology, they can be implemented in a single server.

Depending on a protocol used by the malware application to communicate with the control centre, the analyzing server (109) may use various methods to parse parameters in a malware request or control center response.

When the HTTP protocol is used to determine parameters (parse parameters), the analyzing server (109) may use RFC 2068/2616 or other RFC describing this specific protocol or its later versions.

When malware uses well-known protocols, parsing of malware requests and control center responses may be carried out by the analyzing server (109) according to RFC of this protocol.

In general, the analyzing server (109) may use parsing of a string (included to the malware request or the control center response) by delimiters in order to parse parameters in text (non-binary) protocols. For example, characters such as ",;&−+_|" (delimiting characters) may be used as delimiters. Control characters (\n—linefeed; \r—carriage return etc.) may be also used as delimiters. The fragments acquired by parsing may be pairs containing a parameter and its value. A parameter and its value are further determined in each pair. Splitting a pair by delimiters "=:" not being limited to the said character may also be used for determining parameters. Characters for splitting a fragment into parameters and parameter-value pairs may also be received from external sources.

For example, to parse parameters out of a malware request fragment "id=1819847107&traff=0", the fragment may be divided into parts by the delimiters into two following parts: "id=18198471107" and "traff=0". These parts may be parsed further into parameter-value pairs using "=:" as delimiters. As a result, two parameters—id and traff—with the values of 1819847107 and 0, respectively, may be obtained.

One embodiment of the solution suggests using additional parsing procedures and rules received from external sources by the analyzing server (109), if parsing of a request using standard methods has failed. Such rules and procedures may be generated automatically or manually on the basis of information obtained by way of disassembling or decompiling and analysis of malware.

In at least one embodiment, the parsed requests containing, at least, information about the protocol, method, and request parameters may be stored in RAM and/or data storage devices on the server (109). For example, the data may be stored in a separate server other than the analyzing server (109).

Files, flat files, key-value stores, and various databases may be used as a storage device not being limited to the said options of storage.

At step 204, the plurality of malware requests are grouped based on shared similar malware request parameters contained therein.

In at least one embodiment, requests may be grouped on the analyzing server (109) on the basis of identity of names of their parameters and their number. Depending on a particular data storage device in which parsed requests are stored, various grouping methods, either built in the data storage devices or external, may be used. Thus, when using relational databases, SQL requests that contain a GROUP BY parameter may be used.

For instance, the analyzing server may group the following pool of malware request fragments:
"id=123&traff=0" (1);
"id=232&traff=1&dst=dlt.com" (2);
"id=220&traff=1" (3);
"id=110&src=qq.ru" (4);
"id=617&traff=0&dst=123.ru" (5).

Having grouped on the basis of similarity of parameter names and their quantity, the analyzing server (109) may generates 3 groups having the following elements: {1,3} (group 1), {2,5} (group 2), and {4} (group 3).

At step 205, for each group of the at least one group containing at least two malware requests, a regular expression is generated. Such regular expression describes malware request parameters of each of the at least two malware requests of the group.

After grouping, the analyzing server (109) selects groups of malware requests which includes at least two malware requests. The analyzing server (109) generates regular expressions describing malware request parameter values for each group. In order to describe malware request parameter values, the number of characters acceptable in a parameter and their type (letter, digit, letter or digit, or special characters) are determined.

For example, the regular expression, describing the abovementioned group 1 and malware request parameters, may be the following: "id=\d{3}\x26traff=\d", where \d stands for a digit from 0 to 9; x26 stands for the "&" character; \d{3} stands for three successive digits from 0 to 9. Regular expressions used to describe malware request parameter values may differ in different embodiments of implementation.

In at least one embodiment, the regular expressions that have been generated may be stored in RAM and/or data storage devices on the analyzing server (109). One embodiment of the solution suggests storing data on a separate server other than the analyzing server (109). Files, flat files, key-value stores, and various databases may be used as a storage device/memory not being limited to the said options of storage. A server-generated request is then generated based on the regular expression.

At step 206, a server-generated request is transmitted, via the communication network, to the malware control center.

Using the regular expressions, generated at the previous step, the analyzing server (109) generates server-generated requests and sends them through communication channels to at least one control centre (103, 102). The analyzing server (109) randomly assigns a value to each malware request parameter on the basis of the regular expression describing this parameter. Thus, for the regular expression "id=\d{3}\x26traff=\d" the analyzing server (109) will generate a request containing three random didgits from 0 to 9 in its id parameter and one random digits from 0 to 9 in its traff parameter. The server-generated requests may be generated with a protocol using this specific control centre to exchange data with malware.

A list of malware control centres may be generated by way of collection of malware control center data on malware control centres from open sources and network traffic analyzers (attack detection/prevention systems) with further verification of correctness of the acquired addresses and their accessibility. Open sources of such data may include sources where malicious links are published, commercial subscriptions to malicious resource lists, or data received from network traffic analyzers (attack detection/prevention systems). This data can include, for example and not being limited to, the following: the address of the malware control centre, malware type (a worm, banker trojan, ddos-trojan etc.), and malware name.

In at least one embodiment, when the data is received, the analyzing server (109) verifies correctness of the format of the control centre address. If a control centre address is in the URL-format (URI-format), the server analyzing (109) may carry out verification on the basis of RFC 1738/1630. If a control centre address has been received as an IP-address (IPv4/IPv6), the server (109) may carry out verification on the basis of regular expressions. If a control centre address is incorrect, it may be discarded and not used for sending requests.

The server-generated requests may be sent by the server (109) taking into account the request method and the protocol processable by the control centre.

If, for any reason, a malware control centre cannot be accessed, the analyzing server (109) may stop sending requests. Inaccessibility of a control centre may be determined on the basis of 4xx and 5xx status codes for the HTTP protocol, a long time-out of a response from the server, and other characteristics without being so limited.

In at least one embodiment, various anonymizers may be used in order to avoid blocking of server-generated requests by a malware control centre.

In at least one embodiment, for instance, dynamic proxy servers, or TOR (The Union Router), or VPN (Virtual Private Network), or other hardware and software may be used as anonymizers on the analyzing server (109). The anonymizer selected does not influence the substance of the technical solution.

At step 207, a control center response to the server-generated request is received from the malware control center. In at least one embodiment, the control center response may be decoded and/or decrypted if it was encoded and/or encrypted.

In response to a server-generated request transmitted to the malware control centre by the analyzing server (109), the latter receives a control center response to the request from the malware control centre. At the same time, requests without response, or those on which a message of error has been received from the malware control centre, are marked as irrelevant and are not processed further.

In order to determine whether the control center response received is encoded or encrypted, the analyzing server (109) analyzes this control center response for presence of data representative of characteristics of the cyber attack. The control center response may also be analyzed for presence of an url-address, ip-address, or domain in such response.

In at least one embodiment, if the received control center response is encoded or encrypted, the analyzing server (109) decodes and/or decrypts it. For this purpose, the analyzing server (109) may apply one or more algorithms to convert the data into a human-readable format. For instance, the analyzing server (109) may apply such various algorithms one after another. For example, Base64 decoding, or conversion from Hex format to string format, or decoding using any other methods known from prior art (ROT13 To Text Converter, HTML Encoder etc.) may be used as such algorithms.

If the data is encrypted, it may be decrypted on the analyzing server (109). Such decryption may be done by applying, one after another, the most popular encryption algorithms In at least one embodiment, a database of popular encryption algorithms and decryption procedures may be used. For example, the encryption keys, which have been received by the server (109) from external sources, may be applied to decrypt the encrypted data. For example, such encryption keys may be the ip-address or domain of the malware control centre, or any other data used by malware as an encryption key.

At step 208: Analyzing at least one of the responses for presence of information and data characteristic of cyber attacks.

In order for malware to attack, at least a target and parameters of the cyber attack may be specified, but the list is not limited to the said information to be specified. In order to determine information and data characteristic of cyber attacks, the analyzing server (109) may use analysis based on regular expressions and/or signatures. Thus, presence of a url-address, ip-address, or domain in a the at least one of the responses being analyzed can be regarded as the target of the attack. Besides the target of an attack, a response may contain one or several commands defining the type of the attack including, but not limited to, ddos, flood, syn, grab, intercept, and redirect.

Regular expressions, url-addresses, the list of commands, and signatures used for analysis may be received by the analyzing server (109) from external sources or be generated on the basis of automatic or manual analysis of malware.

Step 209: The results obtained are saved.

In at least one embodiment, the request-response pair obtained, the decoded and decrypted response, data on the coding and encryption algorithms being used with decryption keys may be stored on the analyzing server (109) in nonvolatile or volatile memory or in an external data storage devices/memories. In at least one embodiment, the data may be stored on a separate server other than analyzing server (109). Files, flat files, key-value stores, and various databases can be used for the purposes of storing the data (without being so limited).

The results obtained and stored on the analyzing server (109) may be used by various systems for analysis, compiling statistics, and displaying them to an operator and/or any other interested parties. In at least one embodiment, the collected data may be used in attack prevention systems (for instance, in ddos-prevention systems).

One embodiment of the solution suggests integrating the servers (100, 101) and other ones, performing steps of the method as described herein, on which virtual environments are installed, into one server with the server (109) and other ones performing steps of the method 203-209.

Figure 3:
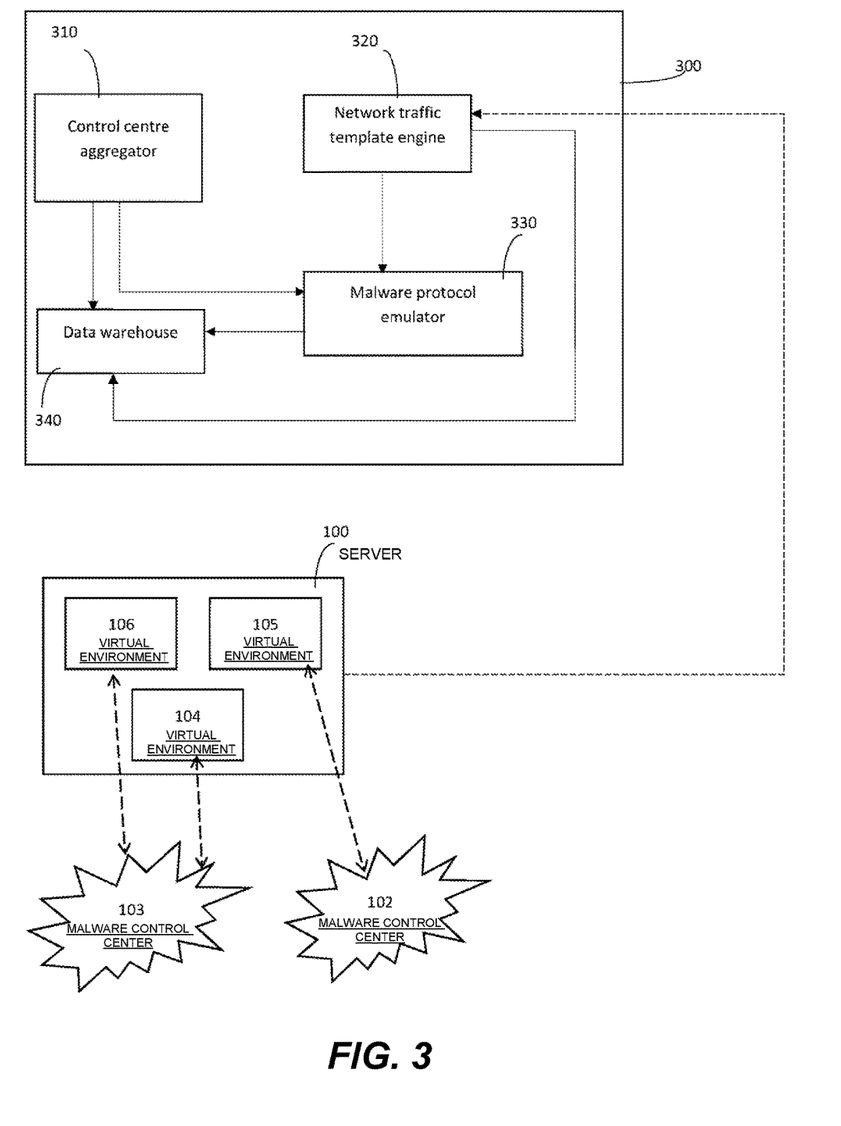
FIG. 3 depicts a schematic representation of a system for executing the method of FIG. 2, the system being implemented in accordance with non-limiting embodiments of the present technology.

Referring now to FIG. 3, a server (300) for analyzing an interaction framework between a malware application and the malware application's control center may comprise a control center aggregator (310), a network traffic template engine (320), and a malware protocol generator (330).

In at least one embodiment, the control centre aggregator is configured as the module (310) running on the server (300) dedicated to collection of data on malware control centres. Sources of such data may include open sources which list malware (malicious) links, commercial subscriptions to lists of malware (malicious) resources, and data received from network traffic analyzers (attack prevention/detection systems). Such data on malware control centres may include, but is not limited to, the address of a malware control centre, the type of malware (a worm banking Trojan, ddos Trojan etc), and the name of malware.

When data on malware control centres is received, the aggregator may verify whether the format of the malware control centre address is correct. If the malware control centre address is in the URL-format (URI-format), verification is carried out on the basis of RFC 1738/1630. If the malware control centre address is represented by an IP-address (IPv4/IPv6), verification is carried out on the basis of regular expressions. If the address of the malware control centre is incorrect it may be discarded and not used for sending requests.

If the address is in the correct format, the aggregator may verify accessibility of the malicious resource.

If the malicious resource is accessible, data on the malware control centre is transferred to the malware protocol emulator.

In at least one embodiment, the network traffic template engine is configured as the module (320) running on the server (300) that ensures collection of fragments of network traffic generated by malware when the latter is launched.

In at least one embodiment, the network traffic template engine (320) receives fragments of network traffic from the virtual environments (104, 105, 106, and 107) into which malware is planted. When being launched on the server (100) in one of the said virtual environments (sandboxes), the malware application may communicate its status and receive instructions from the malware control centre (103 or 102) intended for this specific piece of malware. All requests and responses may be collected by the virtual environment server (100) and may be sent to the network traffic template engine (320). Upon reception of requests, the network traffic template engine (320) may determine parameters and their sequence in the requests, divide requests into groups with identical sets of parameters, and then generate a regular expression describing parameters of the groups of requests for each group containing two or more requests. These regular expressions and, at least, information about the request method and protocol are stored by the module for further use. If an identical template has been detected, such template is discarded and is not stored again.

One embodiment of the solution suggests storing regular expressions in a template store. For example, files, flat files, key-value stores, or various databases may be used as a template store not being limited to the aforesaid.

The malware protocol emulator (330) may access the templates generated through an application programming interface (API) by way of addressing the template store.

In at least one embodiment, the malware protocol emulator (330) is executed on the server (300) which responds to emulation of protocols of interaction of malware and malware control centres from which the malware receives the instructions. Emulation is performed by sending network requests using templates to the malware control centre (103, 102) just as malware sends its requests. In at least one embodiment, the malware protocol emulator (330) receives request templates from the network traffic template engine (320), while data on control centres is received from the control centre aggregator (310).

Upon reception of data, the malware protocol emulator (330) generates requests described by regular expressions received from the network traffic template engine taking into account the request protocol and method. For example, values of request parameters described by regular expressions may be set in a random way.

After this, the malware protocol emulator (330) sends the emulator-generated requests it has generated to malware control centres, the malware control centers being received from the control centre aggregator.

One embodiment of the solution suggests receiving data by the protocol emulator (330) from the template engine (320) through the application programming interface (API).

One embodiment of the solution suggests that templates which have been generated by the template engine (320) are to be received by the protocol emulator (300) addressing the template store generated by the module (320).

One embodiment of the solution suggests using various anonymizers in order to avoid blocking of system requests by the malware control centre.

One embodiment of the solution suggests using dynamic proxy servers, TOR (The Union Router), VPN (Virtual Private Network), or any other hardware or software as an anonymizer not being limited to the aforesaid.

When requests are sent, the module receives responses from control centres and, at the same time, if responses are encoded and/or encrypted, it decodes and/or decrypts them and analyzes them for presence of any information and data characteristic of cyber attacks. If such information and data are detected, the module transfers respective information and data to the data storage device (340).

The data storage device (340) may be located on the server (300). The data storage device (340) may store results of operation of the system, including, but not limited to, the following data: the address of a control centre, templates of requests to which a correct response has been received from malware control centres, the date and time of receiving responses, the original and decoded/decrypted content of control center responses received from a malware control centre containing instructions for malware.

The data storage device (340) may be configured to store various types of data for system support. Examples of such data may include text data, binary data, the date and/or time, integral and fractional numbers etc. The data storage device (340) may store data in files, flat files, key-value stores, or various databases not being limited to the said options. Data may be physically be located in a volatile storage device, nonvolatile storage device, or their combination.

One embodiment of the solution suggests locating modules on one or several servers. For instance, the control server aggregator (310) and the network traffic template engine (320) may be located on the first server, the malware protocol emulator (330) may be located on a second server, the data storage device (340) may be located on a third server, while it may be possible for the three servers to exchange data with each other via communication network (through communication channels).

One embodiment of the solution suggests that communication between the control server aggregator (310), the network traffic template engine (320), the malware protocol emulator (330), and the data storage device (340) may be software-based at the level of API-interfaces (calls of functions/modules).

The system and method as described herein may be used by various systems for analysis, compilation of statistics, and displaying them to an operator or other interested parties. One embodiment of the solution suggests using the obtained data in attack prevention systems (for instance, in ddos prevention systems).

It should be taken into account that this technical solution is not limited to the above-mentioned exact constructions which are shown in the drawings appended hereto, and that various modifications and supplements can be made without deviation from the field of its application.

What is claimed is:

1. A method for analyzing an interaction framework between a malware application and a malware control center associated with the malware application, the method executable by a server; the malware application, the malware control center and the server of the method being communicatively coupled via a communication network, the method comprising:
  executing at a first moment in time:
    uploading the malware application into at least one virtual environment, the at least one virtual environment being executable by the server;
    collecting, by the server, a plurality of malware requests transmitted by the malware application to at least one malware control center via the communication network;
    analyzing the plurality of malware requests to determine, for each given malware request:
      at least one malware request parameter contained therein; and
      an order thereof of the at least one malware request parameter;
    grouping, into at least one group, the plurality of malware requests based on shared malware request parameters contained therein and the order thereof;
    generating a plurality of regular expressions, each of the plurality of regular expressions being generated for each group of the at least one group containing at least two malware requests, each of the plurality of regular expressions describing the malware request parameters and the order thereof in the group;
    transmitting, via the communication network, a server-generated request, the server-generated request having been generated based on one of the plurality of regular expressions, to a plurality of malware control centers;
      the server-generated request having been generated by randomly assigning values to the parameters in the one of the plurality of regular expressions;
    receiving, from a given one of the plurality of malware control centers, a control center response to the server-generated request;
    analyzing the control center response for presence of data representative of characteristic of a cyber attack;
    in response to the analyzing rendering a positive outcome indicative of the presence of data representative of characteristics of the cyber attack associated with the given one of the plurality of malware control centers:
      determining a type of the cyber attack;
      identifying the given one of the plurality of malware control centers as a source of the cyber attack of the determined type;
      storing, in a memory, a cyber attack pattern generated based on the data representative of characteristics of the cyber attack;

the cyber attack pattern comprising the server-generated request and the control center response;
executing at a second moment in time after the first moment in time:
using the cyber attack pattern to determine an occurrence of a future cyber attack of the determined type launched by the given one of the plurality of malware control centers.

2. The method of claim 1, wherein in response to the control center response being encoded or encrypted, the method further comprises decoding or decrypting the control center response, respectively.

3. The method of claim 2 wherein the decoding of the control center response is performed using BASE64 decoding or conversion from Hex format to string format.

4. The method of claim 1 wherein the decrypting the control center response is performed using at least one of ROP13 To Text Converter or HTML Encoder.

5. The method of claim 4 wherein the anonymizer is at least one of dynamic proxy servers, TOR (The Union Router), and VPN (Virtual Private Network).

6. The method of claim 1 wherein when determining at least one malware request parameter and their order in the at least one of the plurality of malware requests, parameters in text protocols are parsed by parsing a string based on delimiters.

7. The method of claim 6 wherein the data storage device is at least one of a file, flat file, key-value store, or a database.

8. The method of claim 1, wherein the analyzing the control center response for presence of data representative of characteristic of a cyber attack comprises:
determining whether the control center responses comprise an indication of an attack target and an indication of an attack action.

9. The method of claim 8, wherein the determining whether the control center responses comprise an indication of an attack target and an indication of an attack action comprises applying one of a regular expressions and signatures bases analysis.

10. The method of claim 1, wherein the transmitting, via the communication network, the server-generated request is executed without further executing the malware application by the at least one virtual environment.

11. The method of claim 1, the method further comprising, prior to the uploading the malware application into the at least one virtual environment, obtaining the malware application.

12. The method of claim 1, wherein parameters of the at least one virtual environment are received from external sources and then applied to the at least one virtual environment.

13. The method of claim 1, wherein collecting, by the server, the plurality of malware requests transmitted by the malware application to the malware control center is executed using a HTTP, FTP, DNS, or IRC data transfer application level protocol.

14. The method of claim 1, the memory comprises at least one of: nonvolatile memory, a volatile memory, and a data storage device.

15. The method of claim 1 further comprising storing the regular expression describing malware request parameters in nonvolatile or volatile memory, or a data storage device.

16. The method of claim 1 further comprising using at least one anonymizer.

17. The method of claim 1 wherein the memory for storing of the cyber attack pattern is at least one of a nonvolatile, a volatile memory, and a data storage device.

18. The method of caim 1, wherein each of the plurality of the malware requests is generated with a protocol used for exchange of data with the malware application by the maleware control center.

19. A system for analyzing an interaction framework between a malware application and the malware application's control center, the system comprising:
a communication network;
a malware control center for:
receiving a plurality of malware requests transmitted by the malware application via the communication network;
receiving a server-generated request;
generating a control center response to the server-generated request; and
a server, communicatively coupled to the malware control center via the communication network, the server for:
executing at least one virtual environment;
uploading the malware application into the at least one virtual environment;
collecting a plurality of malware requests transmitted by the malware application to at least one of malware control center via the communication network;
analyzing the plurality of malware requests to determine, for each given malware request
at least one malware request parameter contained therein; and
an order thereof of the at least one malware request parameter;
grouping, into at least one group, the plurality of malware requests based on shared malware request parameters contained thereof and the order thereof;
generating a plurality of regular expressions, each of the plurality of regular expressions being generated for each group of the at least one group containing at least two malware requests, each of the plurality of regular expressions describing the malware request parameters and the order thereof in the group;
generating a server-generated request based on the regular expression;
the generating comprising randomly assigning values to the parameters in the one of the plurality of regular expressions;
transmitting the server-generated request to a plurality of malware control centers via the communication network;
receiving, from a given one of the plurality of malware control centers, a control center response to the server-generated request;
analyzing the control center response for presence of data representative of characteristic of a cyber attack;
in response to the analyzing rendering a positive outcome indicative of the presence of data representative of characteristics of the cyber attack associated with the given one of the plurality of malware control centers:
determining a type of the cyber attack;
identifying the given one of the plurality of malware control centers as a source of the cyber attack of the determined type;
storing, in a memory, a cyber attack pattern generated based on the data representative of characteristics of the cyber attack the cyber attack pattern comprising the server-generated request and the control center response.

20. A hardware server for analyzing an interaction framework between a malware application and the malware application's control center, the hardware server comprising:

a control center aggregator, including at least one hardware memory, for:
collecting malware control center data on a plurality of malware control centers from open sources and network traffic analyzers, the malware control center data having addresses of the plurality of malware control centers;
transferring the said data to a malware protocol emulator;
a network traffic template engine for:
receiving and collect fragments of network traffic, the fragments of network traffic including a plurality of malware requests and a plurality of malware responses generated by the malware application, the malware application being uploaded to a virtual environment executable by the server;
determining a plurality of malware request parameters and their order in at least one of the plurality of malware requests;
grouping malware requests with identical sets of malware request parameters;
generating a plurality of regular expressions, each of the plurality of regular expressions describing the malware request parameters for each group which includes two or more requests;
transferring the templates that have been generated to the malware protocol emulator;
the malware protocol generator for:
receiving request templates from the network traffic template engine;
receiving malware control center data from the control centre aggregator;
generating a plurality of emulator-generated requests described by regular expressions received from the network traffic template engine;
transmitting the emulator-generated requests to the plurality of malware control centres that have been received from the control centre aggregator;
receiving, from a given one of the plurality of malware control centers, a control center response, if such control center response was encoded and/or encrypted, decoding and/or decrypting the control center response;
analyzing control center response received from the given one of the plurality of malware control centres for presence of data representative of characteristics of a cyber attack;
in response to the analyzing rendering a positive outcome indicative of the presence of data representative of characteristics of the cyber attack associated with the given one of the plurality of malware control centers:
determining a type of the cyber attack;
identifying the given one of the plurality of malware control centers as a source of the cyber attack of the determined type;
storing a cyber attack pattern generated based on the data representative of characteristics of the cyber attack on a data storage device; the data storage device configured to store data received from the malware protocol emulator;
the cyber attack pattern comprising the server-generated request and the control center response.

* * * * *